No. 662,730. Patented Nov. 27, 1900.
A. A. LAZIER.
GOVERNOR FOR GAS ENGINES.
(Application filed Jan. 18, 1900.)
(No Model.) 3 Sheets—Sheet 1.
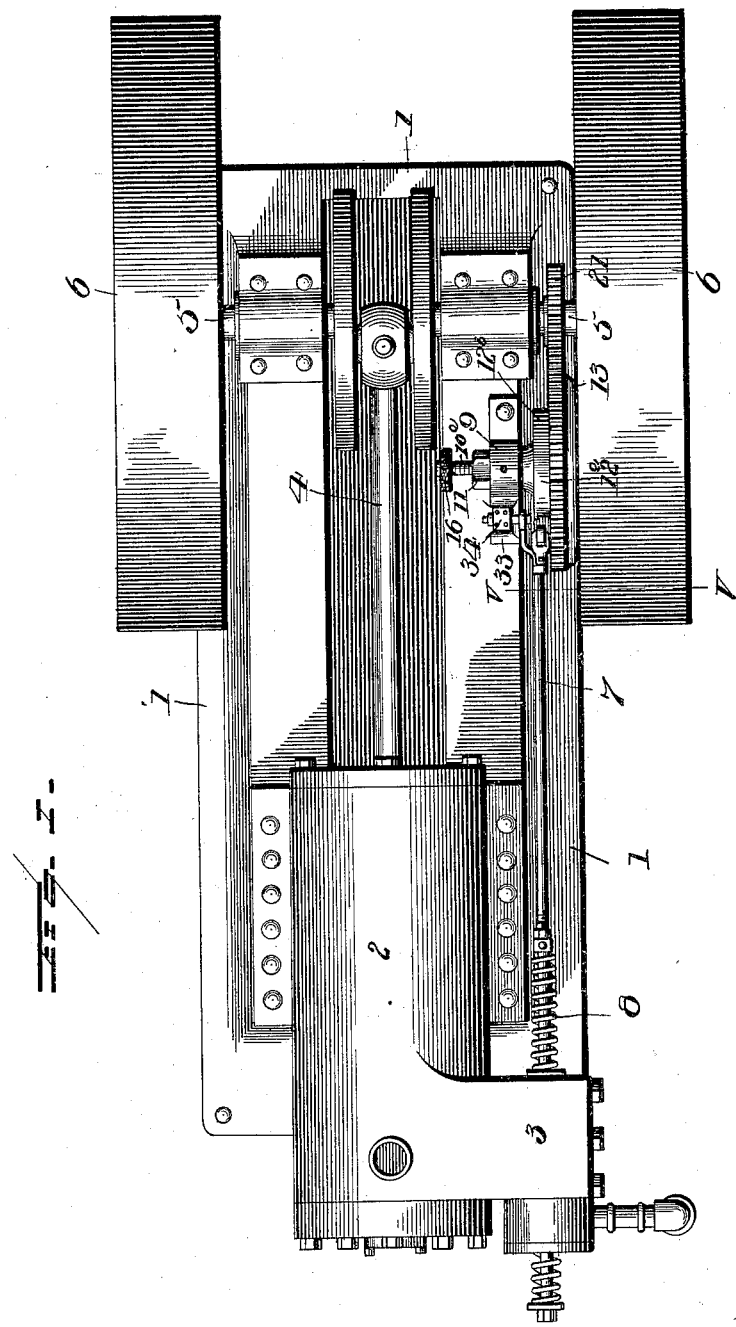
WITNESSES:
L. C. Hills
Walter Allen
INVENTOR
Arthur A. Lazier,
BY Macomber & Ellis
Attorneys

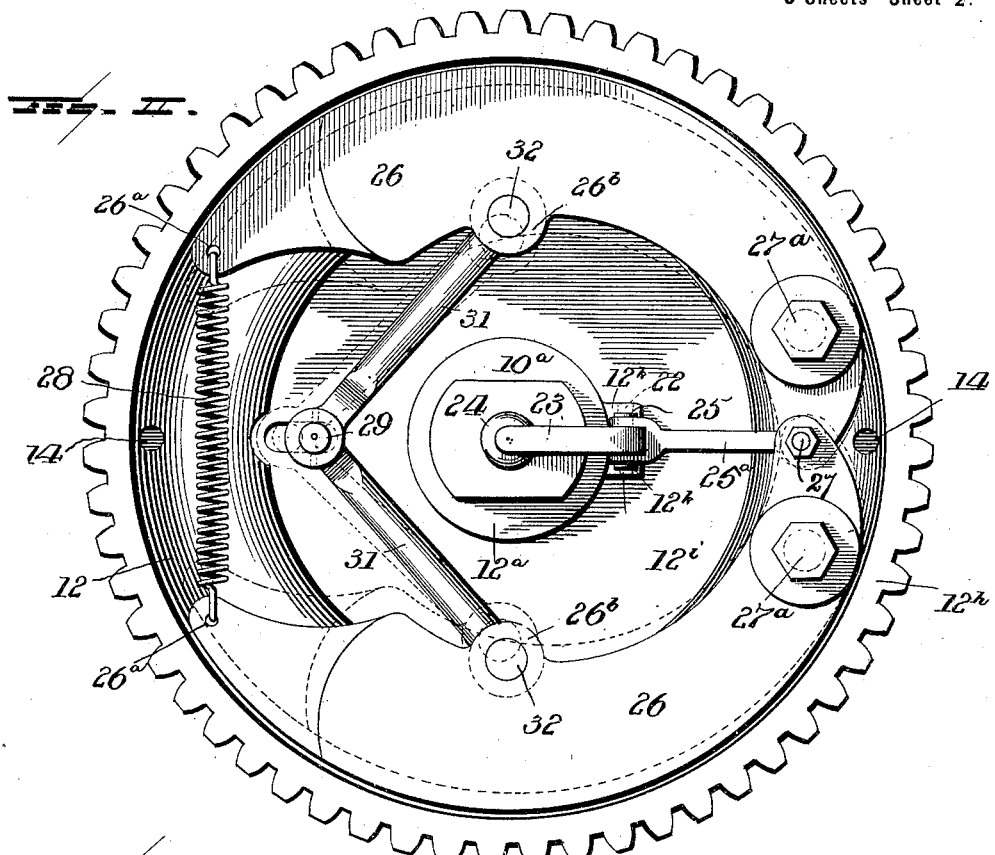
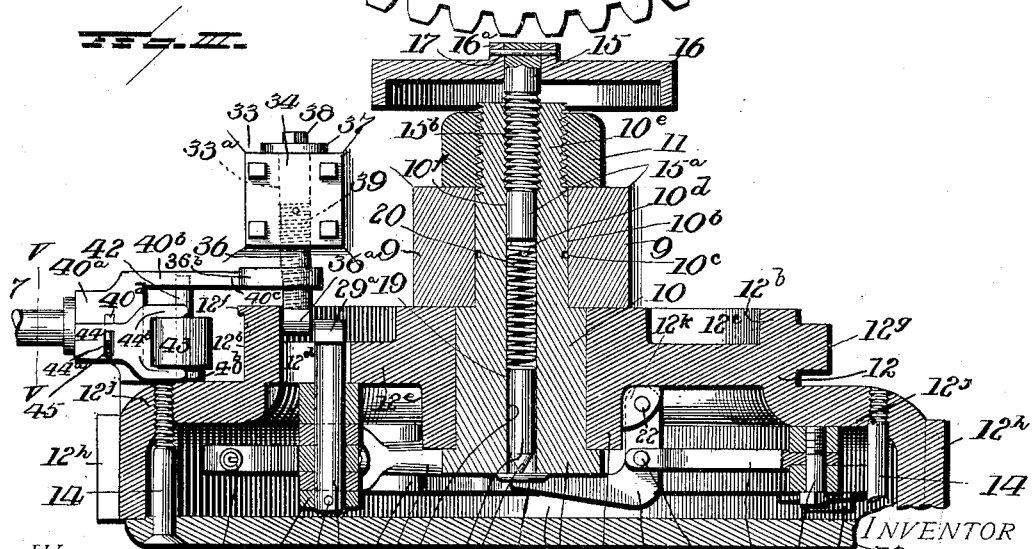

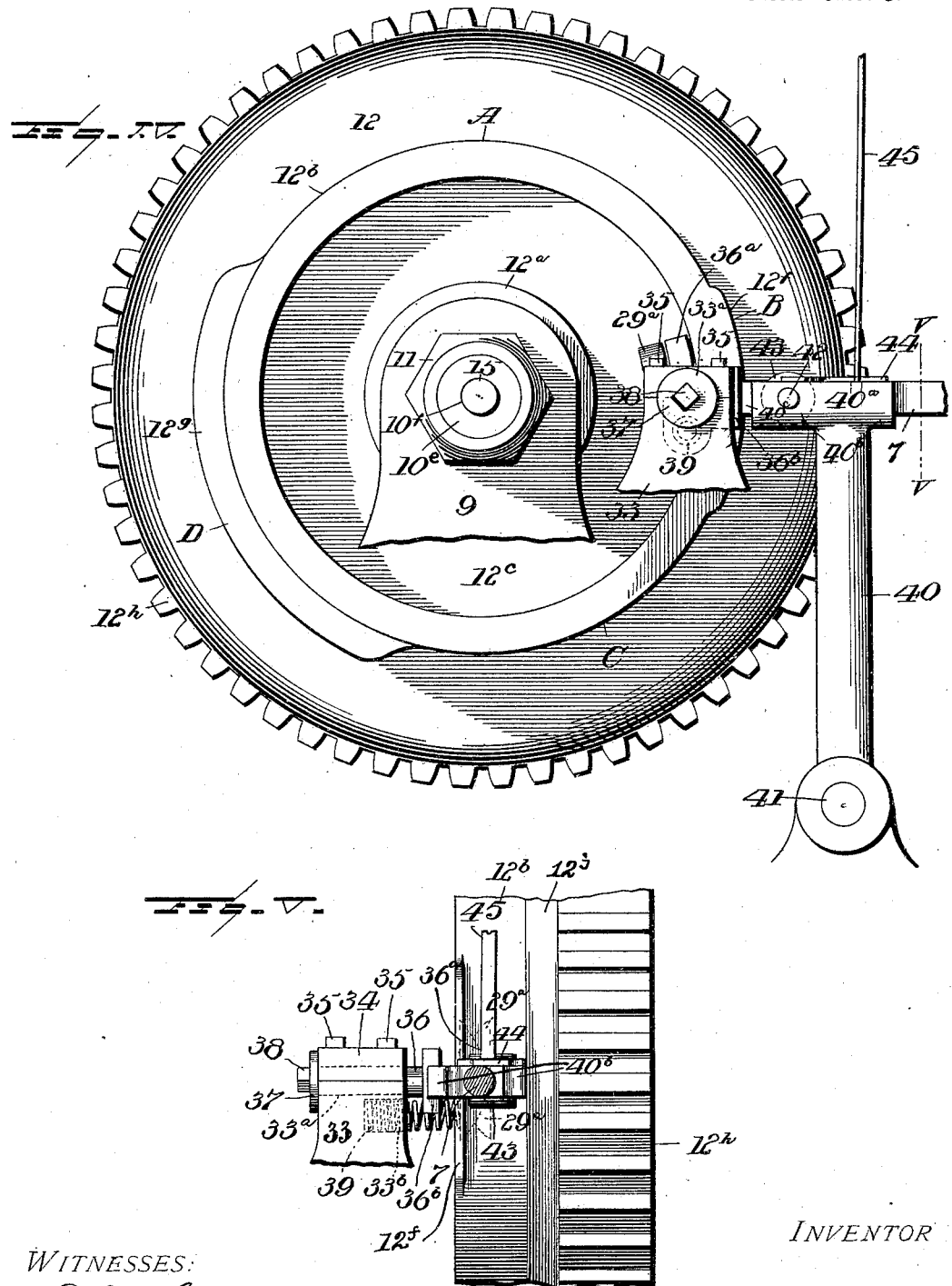

UNITED STATES PATENT OFFICE.

ARTHUR A. LAZIER, OF BUFFALO, NEW YORK.

GOVERNOR FOR GAS-ENGINES.

SPECIFICATION forming part of Letters Patent No. 662,730, dated November 27, 1900.

Application filed January 18, 1900. Serial No. 1,877. (No model.)

*To all whom it may concern:*

Be it known that I, ARTHUR A. LAZIER, a citizen of the United States, and a resident of the city of Buffalo, in the county of Erie and State of New York, have invented certain new and useful Improvements in Governors for Gas-Engines, of which the following is a specification.

My invention relates to improvements in governors for that type of gas-engines which are operated upon the well-known "Otto" or four-cycle principle, in which a charge of gas and air is drawn into the cylinder upon the first outward stroke of the piston, compressed upon the first inward stroke of the piston, ignited and exploded upon the second outward stroke of the piston, and exhausted upon the second inward stroke of the piston, and my invention more particularly relates to those governors which may be used upon any of the ordinary styles of such engines.

The main object of my invention is to secure the maximum degree of efficiency of the engine and the prevention of leakage and loss of fuel.

My improvements consist in certain novel features of construction, as hereinafter described and claimed.

In order that my invention may be fully understood, I will proceed to describe it with reference to the accompanying drawings, in which—

Figure I is a top plan view of an Otto or four-cycle engine to which my improved governor is applied. Fig. II is a front view of my governor, the covering-plate being omitted. Fig. III is an axial section of the governor, the covering-plate being in place. Fig. IV is a rear view of the governor. Fig. V is a detail vertical section on the line V V, Figs. I, III, and IV.

1 is the base of the engine.
2 is the main cylinder.
3 is the exhaust-valve chest.
4 is the connecting-rod.
5 is the crank-shaft.
6 represents the fly-wheels on the crank-shaft, and 7 is the reciprocating exhaust-valve rod carrying a spring 8, whereby it is pressed outward to cause it to bear at its outer end against my improved governor, which I will now describe.

9 is a support located on the base 1 of the engine adjacent to the crank-shaft 5.

10 is a stud formed with an inner head $10^a$ with a reduced part $10^b$, having a circumferential or annular lubricant groove or channel $10^c$ and radial inlet $10^d$ therethrough and fitted in the support 9 and with a screw-threaded outer end $10^e$, receiving a nut 11, whereby the stud 10 is rigidly secured to the support 9. Surrounding the stud 10, so as to rotate thereon, is a casing 12, formed at its inner part with a hub $12^a$ with an annular rim $12^b$, providing a trip-groove $12^c$ between the hub $12^a$ and the annular rim $12^b$ and with a radial slot $12^d$ in the web $12^e$ of the casing. The rim $12^b$ is provided with a small peripheral starting-cam $12^f$ and a large peripheral exhaust-cam $12^g$. The outer part of the casing has a toothed rim $12^h$ and a chamber $12^i$ for a governing lever mechanism, hereinafter described in detail.

13 is a covering-plate for the chamber $12^i$, removably secured by bolts 14 to the inner wall $12^j$ of the outer part.

The stud 10 is also formed with an axial bore or opening $10^f$, extending entirely through the same and screw-threaded at its outer end.

15 is a stem having an inner end $15^a$, closely fitting the axial bore or opening $10^f$, and an intermediate screw-threaded part $15^b$, adjustable in the screw-threaded outer end of the axial bore or opening $10^f$. The outer end of the stem is provided with a hand-wheel 16, formed with a boss $16^a$, through which and the said outer end a cross-pin 17 extends for securing the wheel to the stem. Located within the inner end of the axial bore or opening $10^f$ is a pressure-pin 18, formed with a conical bearing-point $18^a$ and with a flat side $18^b$, so as to leave a passage 19 between it and the wall of the bore or opening $10^f$ for the lubricant passing through the radial inlet $10^d$ into the axial bore or opening $10^f$ to the chamber $12^i$. Within the axial bore or opening $10^f$, between the stem 15 and the pressure-pin 18, is interposed a coil-spring 20 for forcing the pressure-pin inward.

21 is a gear-wheel on the crank-shaft 5 of the engine meshing with the toothed rim $12^h$ of the governor, whereby the latter is rotated by the crank-shaft 5.

Also formed on the inner wall $12^i$ of the outer part of the casing adjacent to the hub $12^a$ are a pair of ears or lugs $12^k$, between which is supported by means of a pivot-pin 22 a bell-crank lever or shoe 23, which is provided with a plate 24, on which the conical bearing-point $18^a$ of the pressure-pin 18 impinges, the plate covering the axial bore or opening $10^f$ of the stud 10. The bell-crank lever or shoe 23 carries a pin 25 near its heel, whereby it is coupled by a connecting-rod $25^a$ to a cross-bolt 27, forming the pivot of a pair of segmental toggle-levers 26, fulcrumed near their pivoted ends by means of bolts $27^a$ to the casing and having their free ends drawn together by a coil-spring 28, whose ends are detachably secured to the eyes $26^a$, formed in the said free ends.

29 is an inner trip-rod extending across the chamber $12^i$, projecting through the radial slot $12^d$ in the web $12^e$ of the casing, formed with a cam-head $29^a$ and adapted to move radially in the trip-groove $12^c$. This inner trip-rod 29 is secured by a washer $30^a$ and a screw 30 to the outer ends of a pair of links 31, whereby it is reciprocated in the radial slot. The links 31 are connected by pivot-pins 32 to ears $26^b$, near the middle part of the segmental toggle-levers 26.

33 is a supporting-block formed with a groove or channel $33^a$ in its top and a spring-recess $33^b$ beneath the groove or channel $33^a$ and having a cap-plate 34 secured by the bolts 35 to the block. This supporting-block is located on the base 1 of the engine adjacent to the stud-support 9. In the groove or channel $33^a$ and adapted to slide therein is an outer trip-rod 36, formed with a cam-head $36^a$, located within the trip-groove $12^c$, against which the cam-head $29^a$ of the inner trip-rod 29 is adapted to bear for operating the outer trip-rod 36. The outer trip-rod 36 is also formed with a laterally-projecting arm or stop $36^b$.

37 is a washer, and 38 is a bolt secured to the outer trip-rod 36, bearing against the supporting-block, whereby the outer trip-rod is limited in its inward movement, while 39 is a coil-spring having its inner end inserted in the spring-recess $33^b$ and bearing at its outer end against the outer cam-head $36^a$ to press the latter inward. The reciprocating exhaust-valve rod 7 is provided with a pivoted support 40, hinged at some convenient place by a stud 41 to the base 1 of the engine. The upper end of this pivoted support is provided with a head $40^a$, having lateral outer and inner arms $40^b$, carrying a cross-pin 42, upon which is loosely mounted a roller 43. The inner arm $40^b$ of the head $40^a$ has an extension $40^c$, adapted to impinge against the arm or stop $36^b$. The head $40^a$ is also formed with a vertical lever-recess $40^d$.

44 is a roller-shifting plate having a slot $44^a$ in line with the lever-recess $40^d$, supported on the head $40^a$ and adapted to be moved sidewise by means of a hand-lever 45, inserted through the slot $44^a$ into the lever-recess $40^d$. The roller-shifting plate 44 has a pair of arms $44^b$ extending across the ends of the roller, whereby the roller is moved laterally on the cross-pin 42.

The casing revolves with the rest of the governor mechanism in consonance with the piston-strokes, the whole being in mesh with the gear-wheel 21 on the crank-shaft 5 of the engine. At the time of the piston's fuel-charging stroke the section or part A of the annular rim $12^b$ of the casing is in front of the roller 43 upon the exhaust-valve rod 7, the section or part B of the annular rim $12^b$ at the time of the first half of the piston's compression-stroke, the section or part C of the annular rim $12^b$ at the explosion-stroke, and the section or part D of the annular rim $12^b$ at the exhaust-stroke.

The purpose of the small peripheral starting-cam $12^f$ on the annular rim $12^b$ is to half reduce the compression of the engine, thus making it easier to start the engine upon its work.

As the valve-rod roller 43 is loosely mounted it can be readily shifted back and forth laterally by means of the lever 45 and shifting-plate 44, thus allowing the roller 43 when it is in contact with the annular rim $12^b$ to engage with the small starting-cam $12^f$. By thus engaging with the small starting-cam $12^f$ the compression is half reduced and the engine easily started.

After the engine is well started the roller 43 is returned to normal position, so as to be free of the starting-cam. The large exhaust-cam operates on the roller 43 to open the exhaust-valve of the engine.

The lubricant groove or channel $10^e$ around the stud 10 is connected with a self-oiler (not shown) located at some suitable place on the base of the engine, and from the self-oiler the groove or channel is supplied with lubricant which passes easily and all of the inner part of the governing mechanism needing lubricant is supplied.

The operation of my governor is as follows: The hand-wheel 16, with the stem 15, being turned so as to move inward, the stem 15 presses against the spring 20, which bears against the pressure-pin 18, causing the conical bearing-point $18^a$ to push the plate 24 and the outer arm of the bell-crank lever or shoe 23 inward, which movement is transmitted to the segmental toggle-levers 26 through the connecting-rod $25^a$. The pressure thus produced regulates the tension of the governing mechanism, allowing the segmental toggle-levers 26 to move more or less freely, according as the pressure on the bell-crank lever or shoe 23 is great or small. As the governor rotates its rapid motion will tend to throw the segmental toggle-levers 26 apart, while a slower motion will permit them to approach each other. When the speed of the engine increases above the normal, the segmental toggle-levers 26 are thrown wide apart, and the links 31, moving with the segmental toggle-levers 26, draw the inner trip-rod 29, carrying the cam-head 29$^a$, away from the cam-head 36$^a$ of the outer trip-rod 36. When the speed of the engine falls below normal, the segmental toggle-levers are drawn toward each other by the action of the spring 28, and the links 31, carrying the inner trip-rod 29, force the latter outward, so as to bring its cam-head 29$^a$ in front of the cam-head 36$^a$ of the outer trip-rod 36. The outer trip-rod 36 is thus pushed from its seat, and its arm or stop 36$^b$ is withdrawn from in front of the extension 40$^c$ of the outer arm 40$^b$ of the head 40$^a$ of the exhaust-valve rod 7. The exhaust-valve rod 7 is then forced by its spring 8 inwardly toward the casing, and the roller 43 is caused to bear against the rim of the casing and against the exhaust-cam 12$^g$ thereon, which opens the exhaust-valve and allows the burned gases to escape. Upon the next stroke of the piston additional fuel is drawn into the cylinder. The exhaust-valve remains open as long as the roller 43 is traveling against the exhaust-cam 12$^g$. The roller 43 will be free to thus travel against the exhaust-cam 12$^g$ and annular rim 12$^b$ until the speed of the engine so increases as to draw away the inner trip-rod 29 from the outer trip-rod 36, when the arm or stop 36$^b$ will be placed in front of the extension 40$^c$ of the exhaust-valve rod 7 and arrest and restrict its outward movement, thus holding the roller 43 away from the casing of the governor and keeping the exhaust-valve open. Thus the speed of the engine is kept constant, and fuel is supplied as fast as necessary to carry the varying load required.

Having thus described my invention, the following is what I claim as new therein and desire to secure by Letters Patent:

1. A governor for gas-engines comprising a stud having an axial bore, a casing, having means whereby it is geared to an engine, mounted on the stud, and formed with a rim having an exhaust-cam and with a radial slot in the web of the casing, an adjustable stem located in the axial bore, segmental toggle-levers pivotally supported in said casing, a bell-crank lever in said casing and having a plate located in engagement with the stem, a connecting-rod whereby the bell-crank lever is coupled to the segmental toggle-levers, an inner trip-rod working in the radial slot and having a cam-head, links whereby the inner trip-rod is connected with the segmental toggle-levers, an exhaust-valve rod having an arm and a roller, an outer trip-rod arranged in the path of the exhaust-valve rod and provided with a cam-head and a stop, said cam-head of the outer trip-rod being arranged for engagement with the cam-head of the inner trip-rod when the latter is in its normal position, and means arranged to press the outer trip-rod inward in position to bring its stop in engagement with the arm on the exhaust-valve rod.

2. A governor for gas-engines comprising a stud having an axial bore, a casing, having means whereby it is geared to an engine, mounted on the stud and formed with a rim having an exhaust-cam and with a radial slot in the web of the casing, an adjustable stem, spring, and pressure-pin located in the axial bore, segmental toggle-levers pivotally supported in said casing, a bell-crank lever in said casing and having a plate on which the pressure-pin impinges, a connecting-rod whereby the bell-crank lever is coupled to the segmental toggle-levers, an inner trip-rod working in the radial slot, and having a cam-head, links whereby the inner trip-rod is connected with the segmental toggle-levers, an exhaust-valve rod having an arm and a roller, an outer trip-rod arranged in the path of the exhaust-valve rod and provided with a cam-head and a stop, said cam-head of the outer trip-rod being arranged for engagement with the cam-head of the inner trip-rod when the latter is in its normal outer position, and means arranged to press the outer trip-rod inward in position to bring its stop in engagement with the arm on the exhaust-valve rod.

3. A governor for gas-engines comprising a stud having an axial bore, a casing, having means whereby it is geared to an engine, mounted on the stud, and formed with a rim having a small starting-cam, and with a radial slot in the web of the casing, an adjustable stem located in the axial bore, segmental toggle-levers pivotally supported in said casing, a bell-crank lever in said casing and having a plate located in engagement with the stem, a connecting-rod whereby the bell-crank lever is coupled to the segmental toggle-levers, an inner trip-rod, working in the radial slot and having a cam-head, links whereby the inner trip-rod is connected with the segmental levers, an exhaust-valve rod having an arm and a roller, an outer trip-rod arranged in the path of the exhaust-valve rod, and provided with a cam-head and a stop, said cam-head of the outer trip-rod being arranged for engagement with the cam-head of the inner trip-rod when the latter is in its normal position; and means arranged to press the outer trip-rod inward in position to bring its stop in engagement with the arm on the exhaust-valve rod.

4. A governor for gas-engines comprising a stud having an axial bore, a casing having means whereby it is geared to an engine, mounted on the stud and formed with a rim having a small starting-cam, a radial slot in the web of the casing, an adjustable stem, spring and pressure-pin located in the axial bore, segmental toggle-levers pivotally supported in said casing, a bell-crank lever in said casing and having a plate on which the pressure-pin impinges, a connecting-rod whereby the bell-crank lever is coupled to the segmental toggle-levers, an inner trip-rod working in the radial slot and having a cam-head, links whereby the inner trip-rod is connected with the segmental toggle-levers, an exhaust-valve rod having an arm and a roller, an outer rod arranged in the path of the exhaust-valve rod, and provided with a cam-head and a stop, said cam-head of the outer trip-rod being arranged for engagement with the cam-head of the inner trip-rod when the latter is in its normal position; and means arranged to press the outer trip-rod inward in position to bring its stop in engagement with the arm on the exhaust-valve rod.

5. A governor for gas-engines comprising a stud having an axial bore, a casing having means whereby it is geared to an engine, mounted on the stud, and formed with a rim having an exhaust-cam and a small starting-cam, and with a radial slot in the web of the casing, an adjustable stem located in the axial bore, segmental toggle-levers pivotally supported in said casing, a bell-crank lever in said casing, and having a plate in engagement with the stem, a connecting-rod whereby the bell-crank lever is coupled to the segmental toggle-levers, an inner trip-rod working in the radial slot and having a cam-head, links whereby the inner trip-rod is connected with the segmental toggle-levers, an exhaust-valve rod having an arm and a roller, an outer trip-rod arranged in the path of the exhaust-valve rod, and provided with a cam-head and a stop, said cam-head of the outer trip-rod being arranged for engagement with the cam-head of the inner trip-rod when the latter is in its normal position; a roller-shifting plate carrying the valve-rod roller, a hand-lever for moving the roller-shifting plate and means arranged to press the outer trip-rod inward in position to bring its stop in engagement with the arm on the exhaust-valve rod.

6. A governor for gas-engines comprising a stud, a casing having means whereby it is geared to an engine, mounted on the stud and formed with a rim having an exhaust-cam and with a radial slot in the web of the casing, segmental toggle-levers pivotally supported in said casing, an inner trip-rod working in the radial slot and having a cam-head, links whereby the inner trip-rod is connected with the segmental toggle-levers, suitable means for regulating the movement of the segmental toggle-levers, an exhaust-valve rod having an arm and a roller, an outer trip-rod arranged in the path of the exhaust-valve rod and provided with a cam-head and a stop, said cam-head of the outer trip-rod being arranged for engagement with the cam-head of the inner trip-rod when the latter is in its normal outer position, and means arranged to press the outer trip-rod inward in position to bring its stop in engagement with the arm on the exhaust-valve rod.

In witness whereof I have hereunto set my hand, this 6th day of January, 1900, in the presence of two witnesses.

ARTHUR A. LAZIER.

Witnesses:
A. W. PLUMLEY,
L. R. ROOT.